US012634330B2

(12) United States Patent
Arjun et al.

(10) Patent No.: US 12,634,330 B2
(45) Date of Patent: May 19, 2026

(54) INTELLIGENT QUERYING OF NETWORK-CONNECTED DEVICES

(71) Applicant: Ordr Inc., Santa Clara, CA (US)

(72) Inventors: Vinod Arjun, Bengaluru (IN); Gnanaprakasam Pandian, Cupertino, CA (US)

(73) Assignee: Ordr Inc., Santa Clara, CA (US)

( * ) Notice: Subject to any disclaimer, the term of this patent is extended or adjusted under 35 U.S.C. 154(b) by 0 days.

(21) Appl. No.: 18/888,882

(22) Filed: Sep. 18, 2024

(65) Prior Publication Data

US 2026/0081945 A1      Mar. 19, 2026

(51) Int. Cl.
| | | |
|---|---|---|
| *H04L 9/40* | (2022.01) | |
| *H04L 29/06* | (2006.01) | |
| *H04L 41/16* | (2022.01) | |

(52) U.S. Cl.
CPC .......... *H04L 63/1433* (2013.01); *H04L 41/16* (2013.01); *H04L 63/20* (2013.01)

(58) Field of Classification Search
CPC ..... H04L 63/1433; H04L 63/20; H04L 63/14; H04L 63/1408; H04L 63/1416; H04L 63/1425; H04L 41/16
See application file for complete search history.

(56) References Cited

U.S. PATENT DOCUMENTS

| | | | |
|---|---|---|---|
| 11,093,852 | B2 | 8/2021 | Benson et al. |
| 11,240,132 | B2 | 2/2022 | Zhang et al. |
| 11,425,017 | B2 | 8/2022 | Musa |
| 11,593,585 | B2 | 2/2023 | Ma et al. |
| 2017/0279829 | A1 | 9/2017 | Vasseur et al. |
| 2019/0258805 | A1* | 8/2019 | Elovici ................ G06F 11/261 |
| 2020/0250530 | A1 | 8/2020 | Shen |
| 2020/0259729 | A1 | 8/2020 | Zhang et al. |
| 2021/0281582 | A1 | 9/2021 | Akella et al. |
| 2022/0038454 | A1 | 2/2022 | Kuarsingh et al. |

FOREIGN PATENT DOCUMENTS

| | | | |
|---|---|---|---|
| EP | | 3223485 A1 | 9/2017 |

OTHER PUBLICATIONS

H. Noguchi, M. Kataoka and Y. Yamato, "Device Identification Based on Communication Analysis for the Internet of Things," in IEEE Access, vol. 7, pp. 52903-52912, 2019, doi: 10.1109/ACCESS. 2019.2910848. (Year: 2019).

* cited by examiner

*Primary Examiner* — Edward Zee
(74) *Attorney, Agent, or Firm* — Invoke

(57) ABSTRACT

Techniques for implementing intelligent querying of network-connected devices are disclosed. In some embodiments, a method comprises the following: identifying a set of unique identifiers corresponding to a set of devices connected to a network; obtaining information associated with a set of communications transmitted to or from a particular device in the set of devices based on the unique identifier corresponding to the particular device; identifying a device type for the unique identifier corresponding to the particular device based on the identified information associated with the set of communications; selecting a subset of a candidate set of queries based on the identified device type for the unique identifier; and executing the subset of the candidate set of queries on the particular device based on the selecting of the subset.

54 Claims, 6 Drawing Sheets

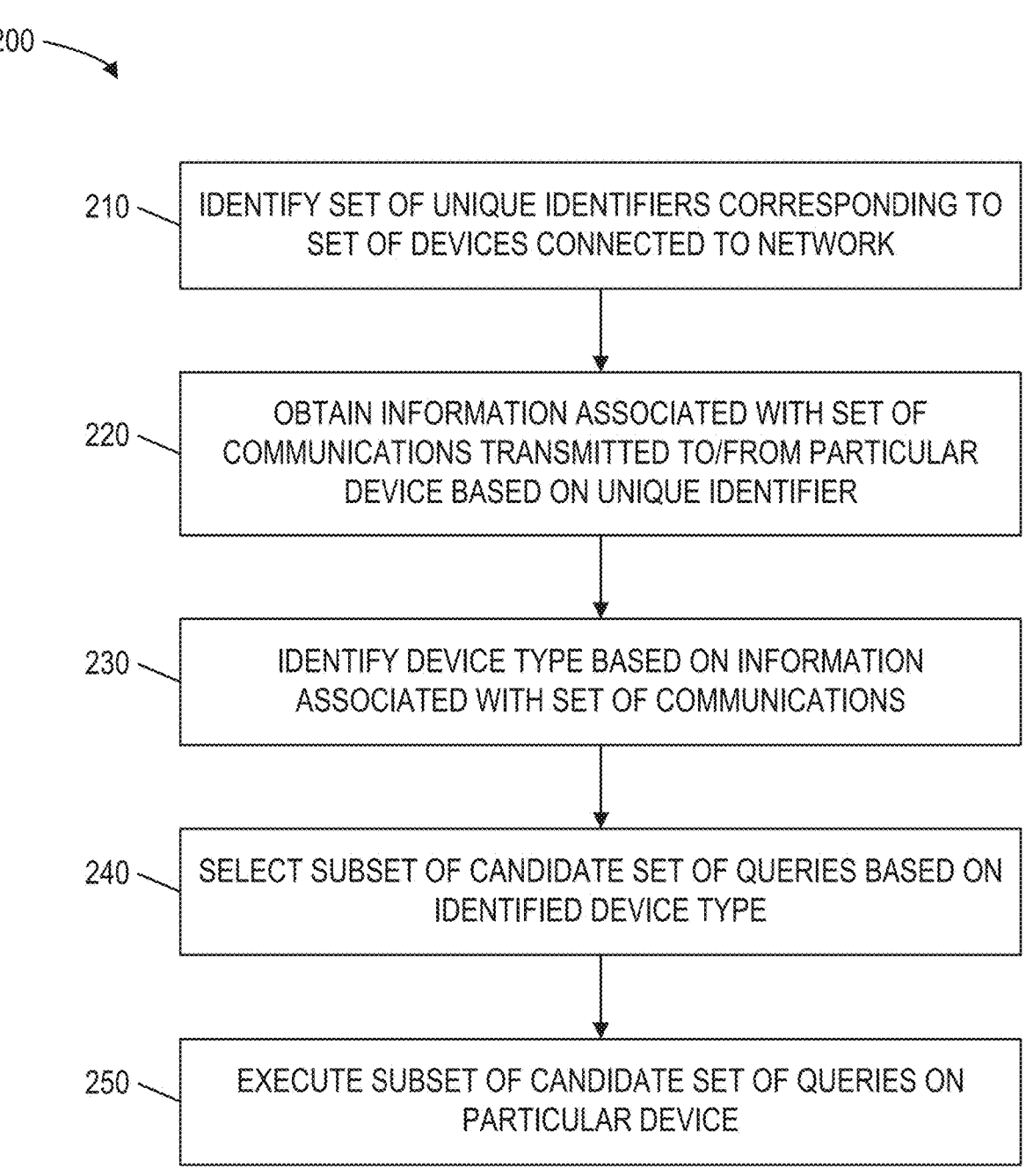

200

210 — IDENTIFY SET OF UNIQUE IDENTIFIERS CORRESPONDING TO SET OF DEVICES CONNECTED TO NETWORK

220 — OBTAIN INFORMATION ASSOCIATED WITH SET OF COMMUNICATIONS TRANSMITTED TO/FROM PARTICULAR DEVICE BASED ON UNIQUE IDENTIFIER

230 — IDENTIFY DEVICE TYPE BASED ON INFORMATION ASSOCIATED WITH SET OF COMMUNICATIONS

240 — SELECT SUBSET OF CANDIDATE SET OF QUERIES BASED ON IDENTIFIED DEVICE TYPE

250 — EXECUTE SUBSET OF CANDIDATE SET OF QUERIES ON PARTICULAR DEVICE

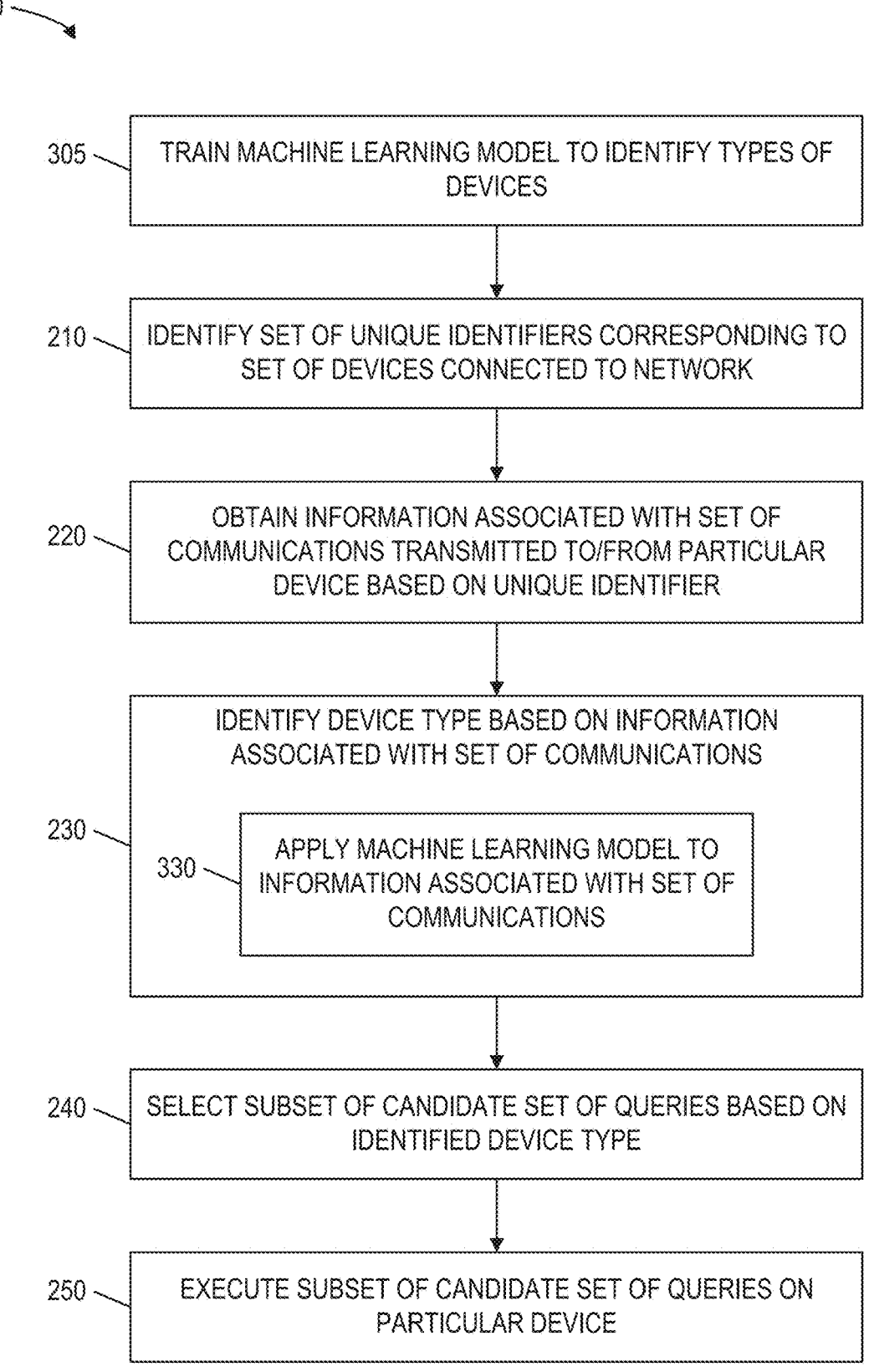

305 — TRAIN MACHINE LEARNING MODEL TO IDENTIFY TYPES OF DEVICES

210 — IDENTIFY SET OF UNIQUE IDENTIFIERS CORRESPONDING TO SET OF DEVICES CONNECTED TO NETWORK

220 — OBTAIN INFORMATION ASSOCIATED WITH SET OF COMMUNICATIONS TRANSMITTED TO/FROM PARTICULAR DEVICE BASED ON UNIQUE IDENTIFIER

230 — IDENTIFY DEVICE TYPE BASED ON INFORMATION ASSOCIATED WITH SET OF COMMUNICATIONS

330 — APPLY MACHINE LEARNING MODEL TO INFORMATION ASSOCIATED WITH SET OF COMMUNICATIONS

240 — SELECT SUBSET OF CANDIDATE SET OF QUERIES BASED ON IDENTIFIED DEVICE TYPE

250 — EXECUTE SUBSET OF CANDIDATE SET OF QUERIES ON PARTICULAR DEVICE

*FIG. 3*

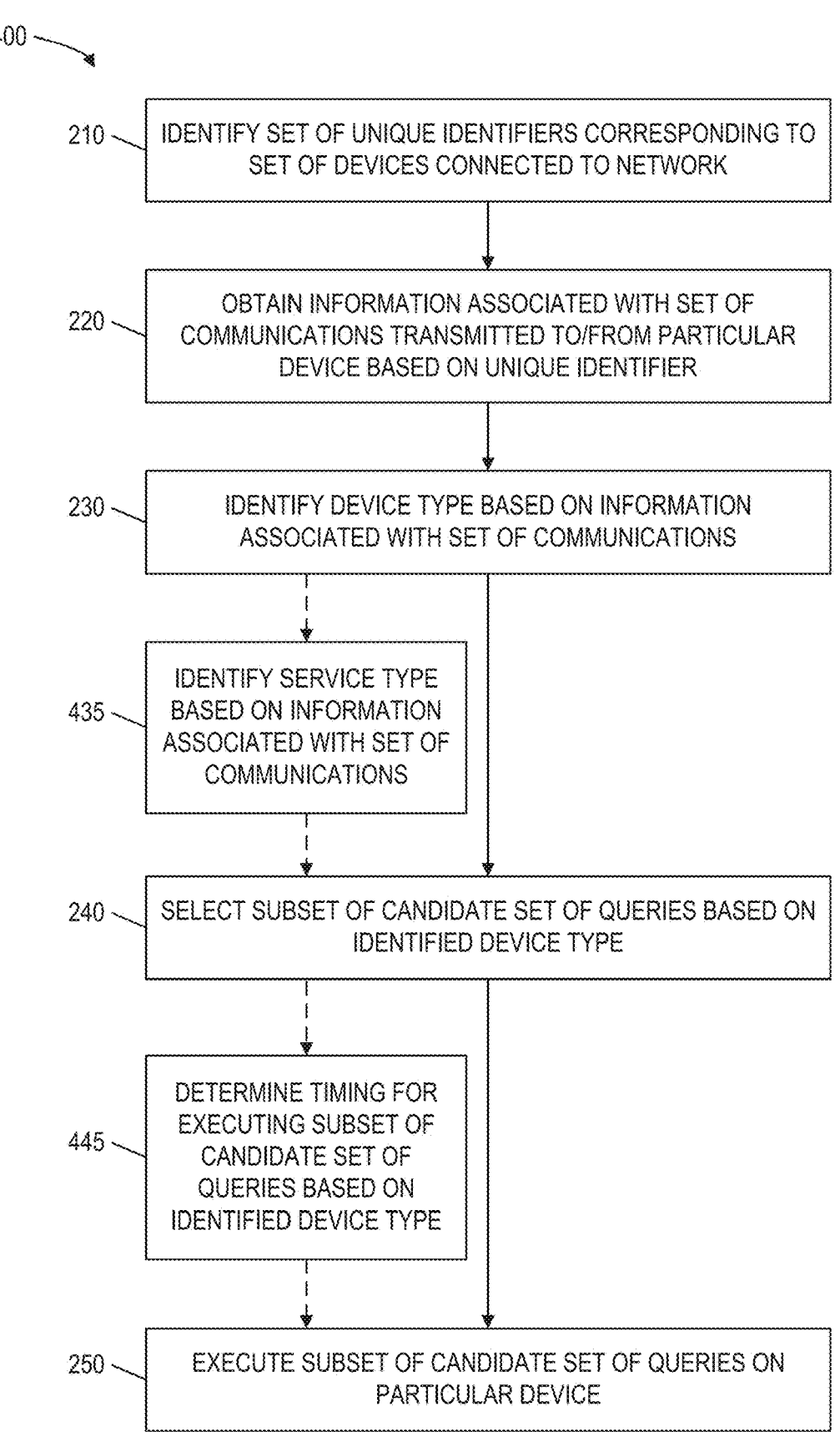

400

210 — IDENTIFY SET OF UNIQUE IDENTIFIERS CORRESPONDING TO SET OF DEVICES CONNECTED TO NETWORK

220 — OBTAIN INFORMATION ASSOCIATED WITH SET OF COMMUNICATIONS TRANSMITTED TO/FROM PARTICULAR DEVICE BASED ON UNIQUE IDENTIFIER

230 — IDENTIFY DEVICE TYPE BASED ON INFORMATION ASSOCIATED WITH SET OF COMMUNICATIONS

435 — IDENTIFY SERVICE TYPE BASED ON INFORMATION ASSOCIATED WITH SET OF COMMUNICATIONS

240 — SELECT SUBSET OF CANDIDATE SET OF QUERIES BASED ON IDENTIFIED DEVICE TYPE

445 — DETERMINE TIMING FOR EXECUTING SUBSET OF CANDIDATE SET OF QUERIES BASED ON IDENTIFIED DEVICE TYPE

250 — EXECUTE SUBSET OF CANDIDATE SET OF QUERIES ON PARTICULAR DEVICE

*FIG. 4*

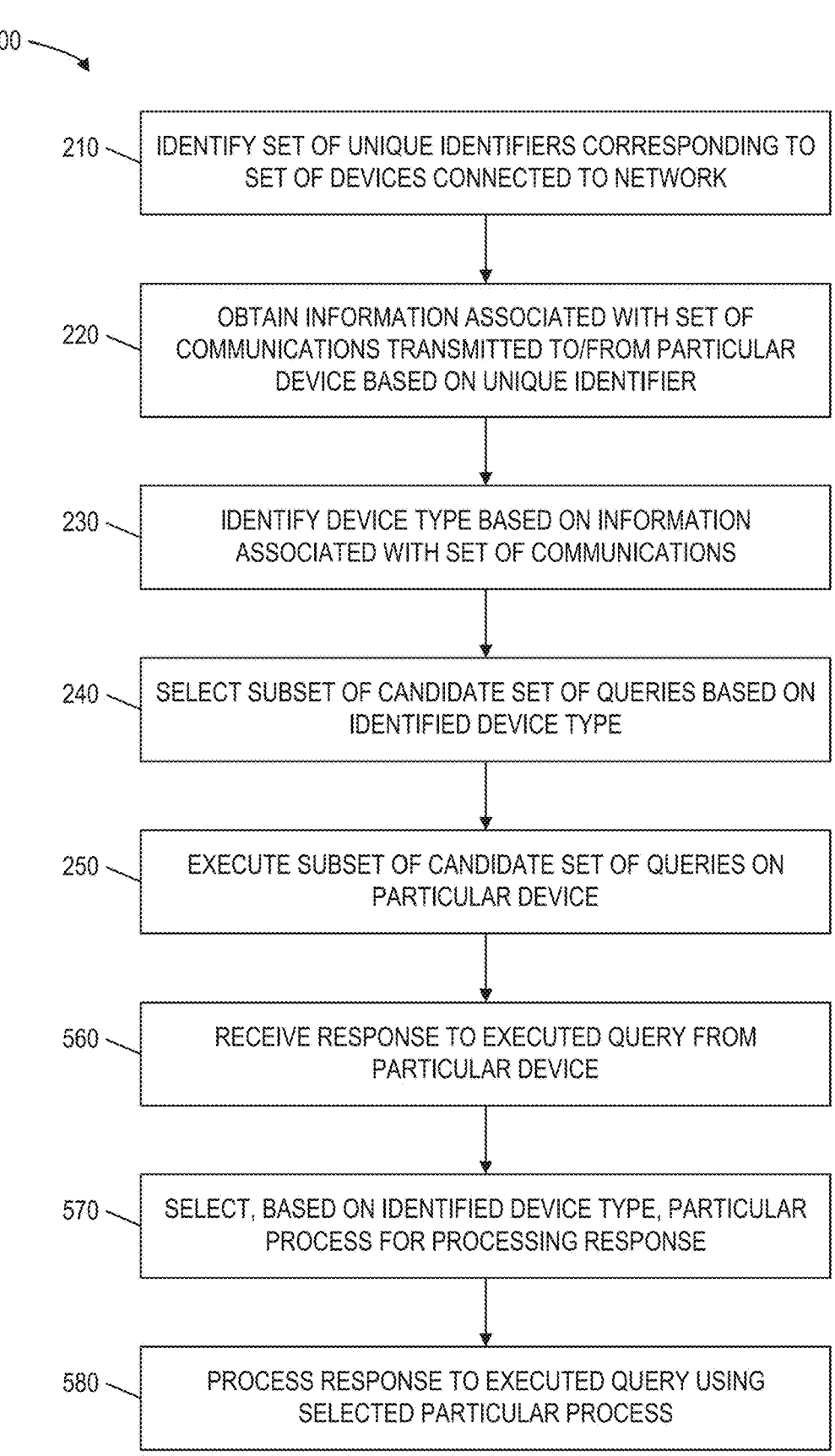

500

210 — IDENTIFY SET OF UNIQUE IDENTIFIERS CORRESPONDING TO SET OF DEVICES CONNECTED TO NETWORK

220 — OBTAIN INFORMATION ASSOCIATED WITH SET OF COMMUNICATIONS TRANSMITTED TO/FROM PARTICULAR DEVICE BASED ON UNIQUE IDENTIFIER

230 — IDENTIFY DEVICE TYPE BASED ON INFORMATION ASSOCIATED WITH SET OF COMMUNICATIONS

240 — SELECT SUBSET OF CANDIDATE SET OF QUERIES BASED ON IDENTIFIED DEVICE TYPE

250 — EXECUTE SUBSET OF CANDIDATE SET OF QUERIES ON PARTICULAR DEVICE

560 — RECEIVE RESPONSE TO EXECUTED QUERY FROM PARTICULAR DEVICE

570 — SELECT, BASED ON IDENTIFIED DEVICE TYPE, PARTICULAR PROCESS FOR PROCESSING RESPONSE

580 — PROCESS RESPONSE TO EXECUTED QUERY USING SELECTED PARTICULAR PROCESS

*FIG. 5*

INTELLIGENT QUERYING OF NETWORK-CONNECTED DEVICES

TECHNICAL FIELD

The present disclosure relates to a system that implements intelligent querying of network-connected devices. In particular, the present disclosure relates to a system that uses information gathered from communications involving devices connected to a network to execute a selected subset of queries for each device on the network.

BACKGROUND

Computer systems commonly use queries to determine attributes and properties of devices connected to a network. These queries can be used to implement asset management solutions to manage devices connected to a network. For example, computer systems may query network-connected devices to determine attributes and properties of the devices as part of a vulnerability management process that keeps computer systems, networks, and enterprise applications safe from cyberattacks and data breaches.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 2 illustrates an example set of operations for implementing intelligent querying of network-connected devices accordance with one or more embodiments;

FIG. 3 illustrates another example set of operations for implementing intelligent querying of network-connected devices in accordance with one or more embodiments;

FIG. 4 illustrates yet another example set of operations for implementing intelligent querying of network-connected devices in accordance with one or more embodiments;

FIG. 5 illustrates yet another example set of operations for implementing intelligent querying of network-connected devices in accordance with one or more embodiments;

DETAILED DESCRIPTION

Figure 1:
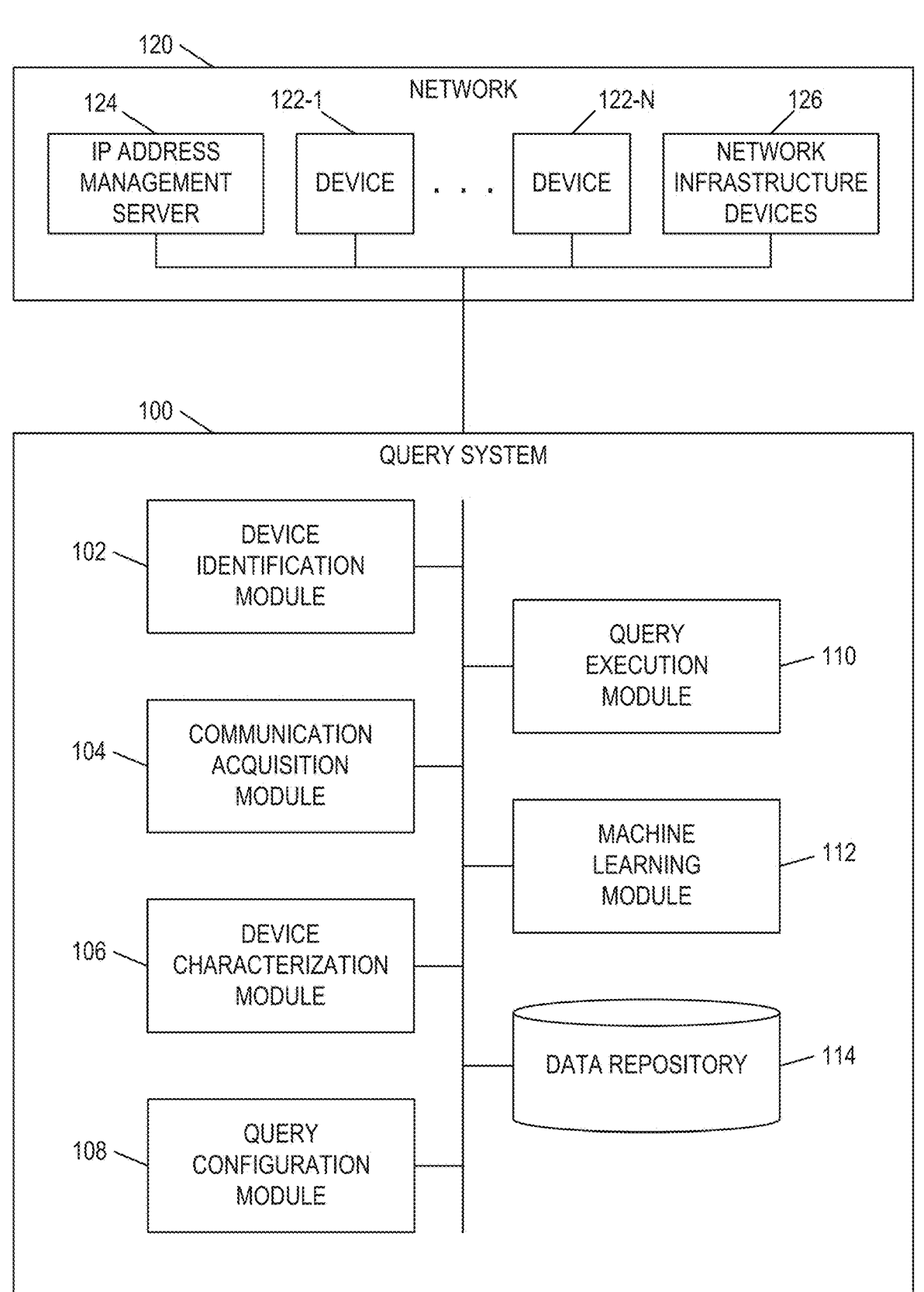
FIG. 1 illustrates a query system in accordance with one or more embodiments.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. SYSTEM ARCHITECTURE
3. INTELLIGENT QUERYING OF NETWORK-CONNECTED DEVICES
4. COMPUTER NETWORKS AND CLOUD NETWORKS
5. HARDWARE OVERVIEW
6. MISCELLANEOUS; EXTENSIONS

1. General Overview

One or more embodiments implement intelligent querying of network-connected devices. The system uses information gathered from communications involving a device connected to a network to intelligently select, from a set of queries, one or more queries to execute on the device. The system then executes the selected subset of the set of queries on the device.

Querying a device may involve configuring different types of requests and parsing the solicited responses from the device to extract device attributes and properties. Different types of devices respond to different types of requests. Current network-connected asset management solutions execute queries in a naïve and sequential approach in which all available potential queries are executed on all devices connected to the targeted network, resulting in several technical problems. These current solutions for querying network-connected devices involve configuring and sending multiple back-to-back queries per device, taking an enormous amount of time to complete. For networks that have thousands of connected devices, the current solutions consume an excessive amount of network bandwidth and place a heavy workload on the connected devices to respond to the queries. This drain on computing resources may interrupt the normal functioning of the network and even disable mission critical devices, such as building management systems, industrial devices, and medical devices.

The system of the present disclosure uses an intelligent approach for querying network-connected devices, thereby dramatically reducing the consumption of computing resources of the target network and making the querying process safer and more efficient. The system of the present disclosure uses information gathered from communications involving the network-connected devices in a network to execute only a selected subset of queries of the correct type for each device on the network, thus reducing the overall time to query network-connected devices and ensuring that the mission critical devices are not impacted.

In an embodiment, the system identifies a set of unique identifiers corresponding to a set of devices connected to a network and then obtains information associated with a set of communications transmitted to or from a particular device in the set of devices based on the unique identifier corresponding to the particular device. Next, the system may identify a device type for the unique identifier corresponding to the particular device based on the information associated with the set of communications. In some embodiments, the system then selects a subset of a candidate set of queries based on the identified device type for the unique identifier and executes the subset of the candidate set of queries on the particular device based on the selection of the subset.

The unique identifiers may be of different types. For example, in one or more embodiments, the set of unique identifiers comprises one or more Internet Protocol (IP) addresses. The system may obtain the one or more IP addresses from an IP address management (IPAM) server of the network or by performing a ping sweep on the network. Other techniques for obtaining the one or more IP addresses are also within the scope of the present disclosure. In some embodiments, the set of unique identifiers additionally, or alternatively, comprises one or more media access control (MAC) addresses. The system may obtain the one or more MAC addresses from a network infrastructure device of the network. Other techniques for obtaining the one or more MAC addresses are also within the scope of the present disclosure.

In one or more embodiments, the system obtains the information associated with the set of communications from a network infrastructure device of the network. The information associated with the set of communications may comprise one or more of the following types of information: port identification numbers, host names, communication protocols, external domains, and patterns of directional flow of communication. Other types of information are also within the scope of the present disclosure.

In some embodiments, the system applies a machine learning model to the information associated with the set of communications to identify the device type for the unique identifier corresponding to the particular device. The system may train the machine learning model to identify corresponding device types of devices. In an embodiment, the training comprises obtaining training data and training the machine learning model based on the training data. The training data may comprise, for each reference device in a reference set of reference devices, a historical set of communications transmitted to or from the reference device. The training data may also comprise, for each reference device in the reference set of reference devices, a corresponding device type of the reference device.

The timing for executing the subset of the candidate set of queries on the particular device may be affected by the device type of the particular device. In an embodiment, the system determines a timing for executing the subset of the candidate set of queries on the particular device based on the identified device type, and the subset of the candidate set of queries is executed on the particular device at the determined timing.

The processing of the response to the executed query may also be affected by the device type of the particular device. In an embodiment, the system receives a response to the executed query from the particular device. Next, the system selects, based on the identified device type, a particular process from a set of processes for processing the response to the executed query. The system then processes the response to the executed query using the selected particular process.

Selecting the subset of the candidate set of queries may also be based on a type of service provided by the particular device. In one or more embodiments, the device type of the particular device is a web server, and the system identifies a service type of the web server based on the information associated with the set of communications. Here, the selection of the subset of the candidate set of queries may be further based on the identified service type of the web server.

The queries in the candidate set of queries may differ in a variety of ways. In some embodiments, a first portion of the queries in the candidate set of queries is configured to request a first type of data from the targeted device, and a second portion of the queries in the candidate set of queries is configured to request a second type of data that is different from the first type of data. In an embodiment, the subset of candidate set of queries that is selected by the system includes one or more queries from the first portion that is configured to request the first type of data but excludes any queries from the second portion that is configured to request the second type of data.

Another way in which the queries in the candidate set of queries may differ is in their communication protocols. In one or more embodiments, a first portion of the queries in the candidate set of queries corresponds to a first communication protocol, and a second portion of the queries in the candidate set of queries corresponds to a second communication protocol that is different from the first communication protocol. In an embodiment, the subset of candidate set of queries that is selected by the system includes one or more queries from the first portion that corresponds to the first communication protocol but excludes any queries from the second portion that corresponds to the second communication protocol.

One or more embodiments described in this Specification and/or recited in the claims may not be included in this General Overview section.

Detailed examples are described below for purposes of clarity. Components and/or operations described below should be understood as one specific example that may not be applicable to certain embodiments. Accordingly, components and/or operations described below should not be construed as limiting the scope of any of the claims.

2. Query System Architecture

FIG. 1 illustrates a query system 100 in accordance with one or more embodiments. As illustrated in FIG. 1, query system 100 includes a device identification module 102, a communication acquisition module 104, a device characterization module 106, a query configuration module 108, a query execution module 110, a machine learning module 112, and a data repository 114. In one or more embodiments, the query system 100 may include more or fewer components than the components illustrated in FIG. 1. The components illustrated in FIG. 1 may be local to or remote from each other. The components illustrated in FIG. 1 may be communicatively coupled to each other via a direct connection or via a network. In some embodiments, the query system 100 is communicatively coupled to a network 120. One or more of the components of the query system 100 may be incorporated into and reside within the network 120. The components illustrated in FIG. 1 may be implemented in software and/or hardware. Each component may be distributed over multiple applications and/or machines. Multiple components may be combined into one application and/or machine. Operations described with respect to one component may instead be performed by another component.

In an embodiment, the components of the query system 100 and the components of the network 120 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

In one or more embodiments, the data repository 114 may be any type of storage unit and/or device (e.g., a file system, database, collection of tables, or any other storage mechanism) for storing data. Furthermore, the data repository 114 may include multiple different storage units and/or devices. The multiple different storage units and/or devices may or may not be of the same type or located at the same physical site.

In some embodiments, the network 120 includes a plurality of devices 122 (e.g., device 122-1 to device 122-N) that are connected to and running on the network 120. The plurality of devices 122 may comprise digital devices such as any of the digital devices discussed above. The devices 122 may share resources located on or provided by network nodes of the network 120. In some embodiments, the network 120 has an IP Address Management (IPAM) server 124 that manages the IP address infrastructure of the network 120. The network also includes network infrastructure devices 126. The network infrastructure devices 126 include the hardware and software components that enable the network 120 to communicate, connect, and operate. The network infrastructure devices 126 may include, but are not limited to, routers, firewalls, switches, servers, load balancers, intrusion detection systems, domain name systems, and storage area networks. Additional embodiments and/or examples relating to computer networks that may be used as the network 120 or to implement any other network-related components shown in FIG. 1 are described below in Section 5, titled "Computer Networks and Cloud Networks."

The query system 100 is configured to execute queries on the devices 122 on the network 120. In some embodiments, the query system 100 is configured to use the queries to collect attributes and properties of the devices 122 for use by a Cyber Asset Attack Surface Management (CAASM) system. A CAASM system helps organizations identify and manage potential vulnerabilities in their assets, such as computing devices, hardware, cloud assets, and applications. The CAASM system may consolidate and normalize asset data. The asset data may include a corresponding identifier for each asset being managed as well as attributes (e.g., technical specifications) of the asset and other data (e.g., usage data) related to the asset. In an embodiment, the asset data is stored in the data repository 114 for subsequent use by the CAASM system. The query system 100 may be running within or connected to a CAASM system to enable the CAASM system to use the data gathered via the queries executed on the devices 122 by the query system 100.

In one or more embodiments, the device identification module 102 is configured to identify a corresponding unique identifier for each device 122 connected to the network 120. A unique identifier is a numeric or alphanumeric string that is associated with a single entity, such as a particular device 122, within a given system. The unique identifiers of the devices 122 may include IP addresses and/or MAC addresses. Other types of unique identifiers are also within the scope of the present disclosure. The unique identifiers identified by the device identification module 102 for the devices 122 may be of different types. For example, the device identification module 102 may identify a first type of unique identifier (e.g., an IP address) for a first portion of the devices 122 connected to the network 120 and may identify a second type of unique identifier (e.g., a MAC address) for a second portion of the devices 122 connected to the network 120.

In some embodiments, the device identification module 102 is configured to obtain IP addresses from the IPAM server 124 of the network 120. Additionally, or alternatively, the device identification module 102 may be configured to obtain IP addresses by performing a ping sweep on the network 120. A ping sweep is a network scanning technique that is used to determine which range of IP addresses map to live hosts. A ping sweep may include sending Internet Control Message Protocol (ICMP) echo requests to multiple hosts. If a given IP address is live, then it will return an ICMP echo reply. IP addresses that do not respond back with an ICMP echo reply are identified by the device identification module 102 as holes, for which the device identification module 102 may send the ping request periodically in order to learn whenever those IP addresses are assigned to a host. The device identification module 102 may employ other techniques for obtaining IP addresses as well.

In an embodiment, the device identification module 102 is configured to obtain MAC addresses. The device identification module 102 may obtain MAC addresses from one or more network infrastructure devices 126 of the network 120. For example, the device identification module 102 may obtain MAC addresses from an Address Resolution Protocol (ARP) table or a MAC table stored in one or more of the network infrastructure devices 126. The device identification module 102 may employ other techniques for obtaining MAC addresses as well.

In one or more embodiments, the communication acquisition module 104 is configured to obtain information associated with a set of communications transmitted to or from a particular device 122 based on the unique identifier corresponding to the particular device 122. The information may include, but is not limited to, port identification numbers, host names, communication protocols, external domains, patterns of directional flow of communication, or any combination thereof. Other types of information are also within the scope of the present disclosure. The communications may include data packets that are transmitted to or from the particular device 122 using a corresponding packet network transmission protocol. In some embodiments, the communication acquisition module 104 is configured to obtain the information associated with the set of communications from one or more of the network infrastructure devices 126 of the network 120.

In an embodiment, the communication acquisition module 104 passively monitors the network 120 and mirrors (e.g., copies) transmissions to and from devices 122. In one example, the communication acquisition module 104 may be embodied as a switch port analyzer (SPAN). A SPAN may copy packets transmitted to or from one or more ports in a network. In another embodiment, the communication acquisition module 104 passively monitors the network 120 via a test access point (TAP) and its associated technology. A TAP is associated with a hardware configuration that copies traffic passing through ports connected to the TAP. For example, a splitter may be used to divide an optical signal transmitted through optical fiber used in a network. Once the data packets are successfully copied, the communication acquisition module 104 may analyze the copied packets to extract information from the packets.

In one or more embodiments, the device characterization module 106 is configured to identify a device type for the unique identifier that corresponds to a particular device 122 based on the information associated with the set of communications obtained for the unique identifier. The device characterization module 106 may be configured to use explicit rules configured by humans to identify the device type for a unique identifier. In an embodiment, the device characterization module 106 may be configured to use a heuristic model to identify the device type for the unique identifier. In some embodiments, the device characterization module 106 is configured to use a machine learning model to identify the device type for the unique identifier.

In an embodiment, the machine learning module 112 includes a machine learning model that is configured to determine the device type for a particular device 122 based on the information associated with the set of communications transmitted to or from the particular device 122. The machine learning module 112 may be configured to train the machine learning model to identify corresponding device types of devices. In an embodiment, the machine learning model 112 is configured to train the machine learning model using training data. The training data may comprise, for each reference device in a reference set of reference devices, a historical set of communications previously transmitted to or transmitted from the reference device. The training data may also comprise, for each reference device in the reference set of reference devices, a corresponding device type of the reference device. The term "reference" is used herein in association with training the machine learning model to make it clear that the device being referred to in association with the term "reference" is being used for training data. The reference devices may be included in, or distinct from, the set of devices 122 connected to the network 120.

In some embodiments, the query configuration module 108 is configured to select a subset of a candidate set of queries based on the identified device type for the unique identifier. The candidate set of queries may be stored in the data repository 114 from which the candidate set of queries may be accessed by the query configuration module 108 in selecting the subset. The query configuration module 108 may use explicit rules configured by humans and select the subset of the candidate set of queries based on the identified device type. In an embodiment, the query configuration module 108 is configured to use a heuristic model to select the subset of the candidate set of queries based on the identified device type.

The queries in the candidate set of queries may differ in a variety of ways. In some embodiments, different queries in the candidate set of queries are configured to request different types of data from a targeted device 122 (e.g., query A configured to request data of type A, query B configured to request data of type B, and so on and so forth). Another way in which the queries in the candidate set of queries may differ is in their communication protocols. In one or more embodiments, different queries in the candidate set of queries are configured to correspond to different communication protocols (e.g., query A corresponding to communication protocol A, query B corresponding to communication protocol B, and so on and so forth). Examples of the different communication protocols that may be used for the candidate set of queries include, but are not limited to, Network Basic Input/Output System (NetBIOS), HyperText Transfer Protocol (HTTP), Server Message Block (SMB), Internet Printing Protocol (IPP), multicast DNS (MDNS), Universal Plug and Play (UPNP), Simple Network Management Protocol (SNMP), and Building Automation and Control Networks (BACnet).

In some embodiments, the query configuration module 108 is further configured to select the subset of the candidate set of queries based on a type of service provided by the particular device 122. For example, if the device type of the particular device 122 is a web server, then the query configuration module 108 may identify a service type of the web server based on the information associated with the set of communications to or from the particular device 122.

In an embodiment, the query execution module 110 is configured to execute the subset of the candidate set of queries on the particular device 122 based on the selection of the subset. The query execution module 110 may be configured to execute the subset of the candidate set of queries by transmitting the subset to the particular device 122. In one or more embodiments, the query execution module 110 is further configured to execute the subset of the candidate set of queries according to a timing that is determined based on the device type of the particular device 122. For example, the query execution module 110 may be configured to determine a timing for executing the subset of the candidate set of queries on the particular device 122 based on the identified device type and configured to execute the subset of the candidate set of queries on the particular device 122 at the determined timing. The timing may comprise a specific point in time or a limited window of time.

In one or more embodiments, the query execution module 110 is further configured to process the response to the executed query, received from the particular device 112, based on the device type of the particular device 122. For example, the query execution module 110 may be configured to receive a response to the executed query from the particular device 122 and select, based on the identified device type, a particular process from a set of processes for processing the response to the executed query. The query execution module 110 may then process the response to the executed query using the selected particular process.

In one or more embodiments, the query system 100 refers to hardware and/or software configured to perform operations described herein for implementing intelligent querying of network-connected devices. Examples of operations for implementing intelligent querying of network-connected devices, as well as further details of the features and functions of the query system 100, are described below with reference to FIGS. 2, 3, 4, and 5.

3. Intelligent Querying of Network-Connected Devices

FIG. 2 illustrates an example set of operations 200 for implementing intelligent querying of network-connected devices in accordance with one or more embodiments. One or more operations illustrated in FIG. 2 may be modified, rearranged, or omitted. Accordingly, the particular sequence of operations illustrated in FIG. 2 should not be construed as limiting the scope of one or more embodiments.

In an embodiment, the query system 100 identifies a set of unique identifiers corresponding to a set of devices connected to a network (Operation 210). As discussed above, the query system 100 may use the device identification module 102 to identify the set of unique identifiers. The set of unique identifiers may comprise one or more IP addresses. In some embodiments, the query system 100 identifies the set of unique identifiers by obtaining the one or more IP addresses from the IPAM server 124 of the network 120. In one or more embodiments, the query system 100 obtains the one or more IP addresses by performing a ping sweep on the network 120. Additionally, or alternatively, the set of unique identifiers may comprise one or more MAC addresses. In an embodiment, the query system 100 identifies the set of unique identifiers by obtaining the one or more MAC addresses from one or more network infrastructure devices 126 of the network 120.

In one or more embodiments, the query system 100 obtains information associated with a set of communications transmitted to or from a particular device 122 in the set of devices 122 based on the unique identifier corresponding to the particular device 122 (Operation 220). The query system 100 may use the communication acquisition module 104 to obtain the information associated with the set of communications, as discussed above. The query system 100 may obtain the information from one or more network infrastructure devices 126 of the network 120.

One type of information that may be associated with the set of communications comprises port identification numbers associated with the identified set of communications. A port identification number is an integer that identifies a specific connection endpoint that directs data to a specific service on a network-connected device. Port identification numbers may be used to identify particular applications or services on a system.

Another type of information that may be associated with the set of communications comprises host names associated with the identified set of communications. A host name is a unique label that identifies a device that is connected to a computer network. A host name is also referred to as a computer name or a domain name. Host names may serve as human-readable identifiers for devices. Host names are used in electronic communication, such as the World Wide Web, to access websites, send e-mails, and connect to remote servers.

Another type of information that may be associated with the set of communications comprises communication protocols associated with the identified set of communications. A communication protocol is a set of rules that allow two or more entities of a communications system to transmit information via any variation of a physical quantity. A communication protocol defines the rules, syntax, semantics, and synchronization of communication and possible error recovery methods.

Another type of information that may be associated with the set of communications comprises external domains associated with the identified set of communications. An external domain is any domain that is registered with a domain provider that is different from the domain provider of the network 120. The external domain may include a website or a DNS service that is hosted outside of the network 120.

Another type of information that may be associated with the set of communications comprises a pattern of directional flow of the set of communications. The directional flow of a communication identifies in which direction the communication was sent. For example, the pattern of directional flow of the set of communications may comprise a pattern of the particular device 122 being the receiver of the communications rather than the sender of the communications.

The query system 100 may obtain any of the types of information discussed above or any combination of the types of information discussed above. Other types of information are also within the scope of the present disclosure.

In some embodiments, the query system 100 identifies a device type for the unique identifier corresponding to the particular device based on the information associated with the set of communications (Operation 230). The query system 100 may use the device characterization module 106 to identify the device type, as discussed above. The query system 100 may use explicit rules configured by humans to identify the device type for the unique identifier. In an embodiment, the query system 100 uses a heuristic model to identify the device type for the unique identifier. In some embodiments, the query system 100 uses a machine learning model to identify the device type for the unique identifier. Other ways of identifying the device type for the unique identifier are also within the scope of the present disclosure.

In an embodiment, the query system 100 selects a subset of a candidate set of queries based on the identified device type for the unique identifier (Operation 240). The query system 100 may use the query configuration module to select the subset of the candidate set of queries, as discussed above. By selecting the subset of the candidate set of queries, the query system 100 reduces the number of queries to be executed on the particular device 122 (e.g., instead of all one-hundred of the queries in the candidate set of queries being executed on the particular device 122, only two of the queries from the candidate set of queries will be executed on the particular device 122).

The queries in the candidate set of queries may differ in a variety of ways. In some embodiments, different queries in the candidate set of queries are configured to request different types of data from a targeted device 122. In one example, the candidate set of queries comprises a first candidate query that is configured to request a first type of data and a second candidate query that is configured to request a second type of data that is different from the first type of data. In this example, the subset of the candidate set of queries includes the first candidate query and excludes the second candidate query.

Another way in which the queries in the candidate set of queries may differ is in their communication protocols. In one or more embodiments, different queries in the candidate set of queries are configured to correspond to different communication protocols. In one example, the candidate set of queries comprises a first candidate query corresponding to a first communication protocol (e.g., HTTP) and a second candidate query corresponding to a second communication protocol (e.g., BACnet) that is different from the first communication protocol. In this example, the subset of the candidate set of queries includes the first candidate query and excludes the second candidate query.

In one or more embodiments, the query system 100 executes the subset of the candidate set of queries on the particular device 122 based on the selecting of the subset (Operation 250). The query system 100 may use the query execution module 110 to execute the subset of the candidate set of queries on the particular device 122, as discussed above. In an embodiment, the query system 100 executes the subset of the candidate set of queries by transmitting the subset to the particular device 122.

FIG. 3 illustrates another example set of operations 300 for implementing intelligent querying of network-connected devices in accordance with one or more embodiments. One or more operations illustrated in FIG. 3 may be modified, rearranged, or omitted. Accordingly, the particular sequence of operations illustrated in FIG. 3 should not be construed as limiting the scope of one or more embodiments. In some embodiments, the set of operations 300 includes the set of operations 200 of FIG. 2.

In an embodiment, the query system 100 trains a machine learning model to identify corresponding device types of devices (Operation 305). The query system 100 may use the machine leaning module 112 to train the machine learning model, as discussed above. In some embodiments, the training of the machine learning model comprises obtaining training data and then training the machine learning model based on the training data. In one or more embodiments, the training data comprises, for each reference device in a reference set of reference devices, a historical set of communications transmitted to or from the reference device. The training data also includes, for each reference device in the reference set of reference devices, a corresponding device type of the reference device. The device types in the training data may be used as labels in the training of the machine learning model.

In some embodiments, the query system 100 identifies the device type for the unique identifier (Operation 230) by applying a machine learning model to the information associated with the set of communications to identify the device type (Operation 330). The query system 100 may input the information associated with the set of communication into the machine learning model to identify the device type.

FIG. 4 illustrates yet another example set of operations 400 for implementing intelligent querying of network-connected devices in accordance with one or more embodiments. One or more operations illustrated in FIG. 4 may be modified, rearranged, or omitted. Accordingly, the particular sequence of operations illustrated in FIG. 4 should not be construed as limiting the scope of one or more embodiments. In some embodiments, the set of operations 400 includes the set of operations 200 of FIG. 2.

In an embodiment, in addition to identifying the device type based on the information associated with the set of communications (Operation 230), the query system 100 also identifies a service type of the particular device 122 (Operation 435). In one example, the query system 100 identifies the device type of the particular device as a web server (Operation 230), and then the query system 100 identifies a service type of the web server based on the information associated with the set of communications. For example, the query system 100 may identify the device type of the particular device 122 as being an infusion pump server, and then the query system 100 may identify the service type of the particular device 122 as being a service to manage infusion pumps based on a port identification number included in the set of communications to the particular device 122. The query system 100 may then select the subset of the candidate set of queries based on the identified service type of the particular device 122. For example, the query system 100 may select queries that correspond to the management of infusion pumps as part of the subset of the candidate set of queries, such as requesting the total number of infusion pumps being managed by the infusion pump server and requesting an identification of the settings being configured for the infusion pumps being managed by the infusion pump server.

In an embodiment, before executing the subset of the candidate set of queries on the particular device (Operation 250), the query system 100 determines a timing for executing the subset of the candidate set of queries on the particular device based on the identified device type (Operation 445). For example, if the query system 100 identifies the device type of the particular device 122 as a mission critical device, such as a medical device or a building management device, then then query system 100 may schedule the execution of the subset of the candidate set of queries for after standard work hours, such as at 10:00 p.m. or between 10:00 p.m. and midnight. After the timing for the execution of the subset of the candidate set of queries is determined, the query system 100 may execute the subset of the candidate set of queries at the determined timing, such as at a specific point in time or within a window of time in accordance with the determined timing.

FIG. 5 illustrates yet another example set of operations 500 for implementing intelligent querying of network-connected devices in accordance with one or more embodiments. One or more operations illustrated in FIG. 5 may be modified, rearranged, or omitted. Accordingly, the particular sequence of operations illustrated in FIG. 5 should not be construed as limiting the scope of one or more embodiments. In some embodiments, the set of operations 500 includes the set of operations 200 of FIG. 2.

In an embodiment, after executing the subset of the candidate set of queries (Operation 250), the query system 100 receives a response to the executed subset of the candidate set of queries from the particular device 122 (Operation 560). The response may be received by the query execution module 110, as discussed above. In some embodiments, the response includes data from the particular device 122.

In one or more embodiments, the query system 100 selects, based on the identified device type, a particular process from a set of processes for processing the response to the executed subset of the candidate set of queries (Operation 570). One process in the set of processes may be to filter out certain types of data (e.g., personal or confidential user information) from the response before storing the remaining data in the data repository 114, whereas another process in the set of processes may be to store the data included in the response in the data repository 114 without performing any filtering. Other types of processes are also within the scope of the present disclosure. In some embodiments, the query system 100 stores a mapping of device types to particular processes in the data repository 114 and selects the particular process by mapping the identified device type for the particular device 122 to the particular process. Other ways of selecting the particular process for processing the response to the executed subset of the candidate queries are also within the scope of the present disclosure.

In an embodiment, the query system 100 processes the response to the executed subset of the candidate set of queries using the selected particular process (Operation 580). The query system 100 may use the query execution module 110 to process the response using the selected particular process. However, other components may be used to process the response using the selected particular process.

4. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis.

Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally, or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
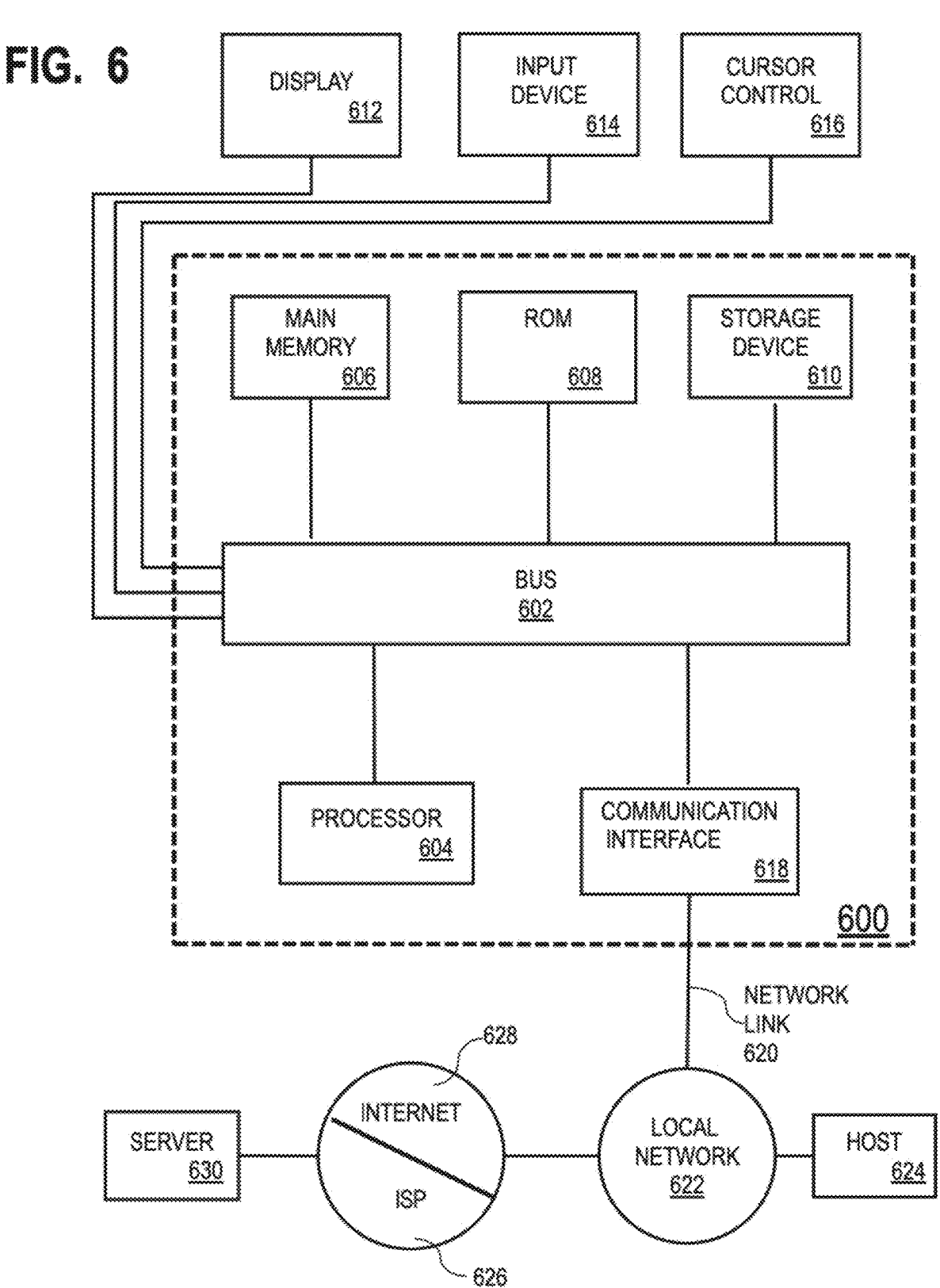
FIG. 6 is a block diagram that illustrates a computer system in accordance with one or more embodiments.

For example, FIG. 6 is a block diagram that illustrates a computer system 600 upon which an embodiment of the disclosure may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or a Solid State Drive (SSD) is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

6. Miscellaneous; Extensions

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner which might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions which, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. One or more non-transitory computer readable media comprising instructions which, when executed by one or more hardware processors, causes performance of operations comprising:

identifying a set of unique identifiers corresponding to a set of devices connected to a network;

obtaining information associated with a set of communications transmitted to or from a particular device in the set of devices based on the unique identifier corresponding to the particular device;

identifying a device type for the unique identifier corresponding to the particular device based on the information associated with the set of communications;

selecting a subset of a candidate set of queries based on the identified device type for the unique identifier; and executing the subset of the candidate set of queries on the particular device based on the selecting of the subset.

2. The media of claim 1, wherein the set of unique identifiers comprises one or more Internet Protocol (IP) addresses.

3. The media of claim 2, wherein the identifying the set of unique identifiers comprises obtaining the one or more IP addresses from an IP address management (IPAM) server of the network.

4. The media of claim 2, wherein the identifying the set of unique identifiers comprises obtaining the one or more IP addresses by performing a ping sweep on the network.

5. The media of claim 1, wherein the set of unique identifiers comprises one or more media access control (MAC) addresses, and the identifying the set of unique identifiers comprises obtaining the one or more MAC addresses from a network infrastructure device of the network.

6. The media of claim 1, wherein the obtaining the information associated with the set of communications comprises obtaining the information from a network infrastructure device of the network.

7. The media of claim 1, wherein the information associated with the set of communications comprises one or more port identification numbers associated with the identified set of communications.

8. The media of claim 1, wherein the information associated with the set of communications comprises one or more host names associated with the identified set of communications.

9. The media of claim 1, wherein the information associated with the set of communications comprises one or more communication protocols associated with the identified set of communications.

10. The media of claim 1, wherein the information associated with the set of communications comprises one or more external domains associated with the identified set of communications.

11. The media of claim 1, wherein the information associated with the set of communications comprises a pattern of directional flow of the set of communications.

12. The media of claim 1, wherein the identifying the device type for the unique identifier corresponding to the particular device comprises applying a machine learning model to the information associated with the set of communications to identify the device type.

13. The media of claim 12, wherein the operations further comprise:

training the machine learning model to identify corresponding device types of devices, the training comprising:

obtaining training data comprising:

for each reference device in a reference set of reference devices, a historical set of communications transmitted to or transmitted from the reference device; and for each reference device in the reference set of reference devices, a corresponding device type of the reference device; and training the machine learning model based on the training data.

14. The media of claim 1, wherein the operations further comprise:

determining a timing for executing the subset of the candidate set of queries on the particular device based on the identified device type, wherein the subset of the candidate set of queries is executed on the particular device at the determined timing.

15. The media of claim 1, wherein the operations further comprise:

receiving a response to the executed subset of the candidate set of queries from the particular device;

selecting, based on the identified device type, a particular process from a set of processes for processing the response to the executed subset of the candidate set of queries; and processing the response to the executed subset of the candidate set of queries using the selected particular process.

16. The media of claim 1, wherein the device type comprises a web server and the operations further comprise:

identifying a service type of the web server based on the information associated with the set of communications, wherein the selecting the subset of the candidate set of queries is further based on the identified service type of the web server.

17. The media of claim 1, wherein the candidate set of queries comprises a first candidate query requesting a first type of data and a second candidate query requesting a second type of data that is different from the first type of data, the subset of the candidate set of queries includes the first candidate query and excludes the second candidate query.

18. The media of claim 1, wherein the candidate set of queries comprises a first candidate query corresponding to a first communication protocol and a second candidate query corresponding to a second communication protocol that is different from the first communication protocol, the subset of the candidate set of queries includes the first candidate query and excludes the second candidate query.

19. A method performed by at least one device including a hardware processor, the method comprising:

identifying a set of unique identifiers corresponding to a set of devices connected to a network;

obtaining information associated with a set of communications transmitted to or from a particular device in the set of devices based on the unique identifier corresponding to the particular device;

identifying a device type for the unique identifier corresponding to the particular device based on the information associated with the set of communications;

selecting a subset of a candidate set of queries based on the identified device type for the unique identifier; and executing the subset of the candidate set of queries on the particular device based on the selecting of the subset.

20. The method of claim 19, wherein the set of unique identifiers comprises one or more Internet Protocol (IP) addresses.

21. The method of claim 20, wherein the identifying the set of unique identifiers comprises obtaining the one or more IP addresses from an IP address management (IPAM) server of the network.

22. The method of claim 20, wherein the identifying the set of unique identifiers comprises obtaining the one or more IP addresses by performing a ping sweep on the network.

23. The method of claim 19, wherein the set of unique identifiers comprises one or more media access control (MAC) addresses, and the identifying the set of unique identifiers comprises obtaining the one or more MAC addresses from a network infrastructure device of the network.

24. The method of claim 19, wherein the obtaining the information associated with the set of communications comprises obtaining the information from a network infrastructure device of the network.

25. The method of claim 19, wherein the information associated with the set of communications comprises one or more port identification numbers associated with the identified set of communications.

26. The method of claim 19, wherein the information associated with the set of communications comprises one or more host names associated with the identified set of communications.

27. The method of claim 19, wherein the information associated with the set of communications comprises one or more communication protocols associated with the identified set of communications.

28. The method of claim 19, wherein the information associated with the set of communications comprises one or more external domains associated with the identified set of communications.

29. The method of claim 19, wherein the information associated with the set of communications comprises a pattern of directional flow of the set of communications.

30. The method of claim 19, wherein the identifying the device type for the unique identifier corresponding to the particular device comprises applying a machine learning model to the information associated with the set of communications to identify the device type.

31. The method of claim 30, wherein the method further comprises:

training the machine learning model to identify corresponding device types of devices, the training comprising:

obtaining training data comprising:

for each reference device in a reference set of reference devices, a historical set of communications transmitted to or transmitted from the reference device; and for each reference device in the reference set of reference devices, a corresponding device type of the reference device; and training the machine learning model based on the training data.

32. The method of claim 19, wherein the method further comprises:

determining a timing for executing the subset of the candidate set of queries on the particular device based on the identified device type, wherein the subset of the candidate set of queries is executed on the particular device at the determined timing.

33. The method of claim 19, wherein the method further comprises:

receiving a response to the executed subset of the candidate set of queries from the particular device;

selecting, based on the identified device type, a particular process from a set of processes for processing the response to the executed subset of the candidate set of queries; and processing the response to the executed subset of the candidate set of queries using the selected particular process.

34. The method of claim 19, wherein the device type comprises a web server and the method further comprises:

identifying a service type of the web server based on the information associated with the set of communications, wherein the selecting the subset of the candidate set of queries is further based on the identified service type of the web server.

35. The method of claim 19, wherein the candidate set of queries comprises a first candidate query requesting a first type of data and a second candidate query requesting a second type of data that is different from the first type of data, the subset of the candidate set of queries includes the first candidate query and excludes the second candidate query.

36. Thee method of claim 19, wherein the candidate set of queries comprises a first candidate query corresponding to a first communication protocol and a second candidate query corresponding to a second communication protocol that is different from the first communication protocol, the subset of the candidate set of queries includes the first candidate query and excludes the second candidate query.

37. A system comprising:

at least one device including a hardware processor;

the system being configured to perform operations comprising:

identifying a set of unique identifiers corresponding to a set of devices connected to a network;

obtaining information associated with a set of communications transmitted to or from a particular device in the set of devices based on the unique identifier corresponding to the particular device;

identifying a device type for the unique identifier corresponding to the particular device based on the information associated with the set of communications;

selecting a subset of a candidate set of queries based on the identified device type for the unique identifier; and executing the subset of the candidate set of queries on the particular device based on the selecting of the subset.

38. The system of claim 37, wherein the set of unique identifiers comprises one or more Internet Protocol (IP) addresses.

39. The system of claim 38, wherein the identifying the set of unique identifiers comprises obtaining the one or more IP addresses from an IP address management (IPAM) server of the network.

40. The system of claim 38, wherein the identifying the set of unique identifiers comprises obtaining the one or more IP addresses by performing a ping sweep on the network.

41. The system of claim 37, wherein the set of unique identifiers comprises one or more media access control (MAC) addresses, and the identifying the set of unique identifiers comprises obtaining the one or more MAC addresses from a network infrastructure device of the network.

42. The system of claim 37, wherein the obtaining the information associated with the set of communications comprises obtaining the information from a network infrastructure device of the network.

43. The system of claim 37, wherein the information associated with the set of communications comprises one or more port identification numbers associated with the identified set of communications.

44. The system of claim 37, wherein the information associated with the set of communications comprises one or more host names associated with the identified set of communications.

45. The system of claim 37, wherein the information associated with the set of communications comprises one or more communication protocols associated with the identified set of communications.

46. The system of claim 37, wherein the information associated with the set of communications comprises one or more external domains associated with the identified set of communications.

47. The system of claim 37, wherein the information associated with the set of communications comprises a pattern of directional flow of the set of communications.

48. The system of claim 37, wherein the identifying the device type for the unique identifier corresponding to the particular device comprises applying a machine learning model to the information associated with the set of communications to identify the device type.

49. The system of claim 48, wherein the operations further comprise:

training the machine learning model to identify corresponding device types of devices, the training comprising:

obtaining training data comprising:

for each reference device in a reference set of reference devices, a historical set of communications transmitted to or transmitted from the reference device; and for each reference device in the reference set of reference devices, a corresponding device type of the reference device; and training the machine learning model based on the training data.

50. The system of claim 37, wherein the operations further comprise:

determining a timing for executing the subset of the candidate set of queries on the particular device based on the identified device type, wherein the subset of the candidate set of queries is executed on the particular device at the determined timing.

51. The system of claim 37, wherein the operations further comprise:
   receiving a response to the executed subset of the candidate set of queries from the particular device;
   selecting, based on the identified device type, a particular process from a set of processes for processing the response to the executed subset of the candidate set of queries; and
   processing the response to the executed subset of the candidate set of queries using the selected particular process.

52. The system of claim 37, wherein the device type comprises a web server and the operations further comprise:
   identifying a service type of the web server based on the information associated with the set of communications, wherein the selecting the subset of the candidate set of queries is further based on the identified service type of the web server.

53. The system of claim 37, wherein the candidate set of queries comprises a first candidate query requesting a first type of data and a second candidate query requesting a second type of data that is different from the first type of data, the subset of the candidate set of queries includes the first candidate query and excludes the second candidate query.

54. The system of claim 37, wherein the candidate set of queries comprises a first candidate query corresponding to a first communication protocol and a second candidate query corresponding to a second communication protocol that is different from the first communication protocol, the subset of the candidate set of queries includes the first candidate query and excludes the second candidate query.

* * * * *